(12) United States Patent
Lei et al.

(10) Patent No.: US 12,505,022 B2
(45) Date of Patent: Dec. 23, 2025

(54) SYSTEM TESTING METHOD, ELECTRONIC DEVICE, AND COMPUTER PROGRAM PRODUCT

(71) Applicant: Dell Products L.P., Round Rock, TX (US)

(72) Inventors: Ray Guangliang Lei, Shanghai (CN); Kay Shan, Shanghai (CN); Ying Zhang, Shanghai (CN); Xinquan Fu, Shanghai (CN); Chun Xi Kenny Chen, Shanghai (CN)

(73) Assignee: DELL PRODUCTS L.P., Round Rock, TX (US)

( * ) Notice: Subject to any disclaimer, the term of this patent is extended or adjusted under 35 U.S.C. 154(b) by 509 days.

(21) Appl. No.: 18/067,634

(22) Filed: Dec. 16, 2022

(65) Prior Publication Data

US 2024/0134763 A1 Apr. 25, 2024
US 2024/0232029 A9 Jul. 11, 2024

(30) Foreign Application Priority Data

Oct. 21, 2022 (CN) .......................... 202211294739.9

(51) Int. Cl.
*G06F 11/22* (2006.01)
*G06F 11/26* (2006.01)

(52) U.S. Cl.
CPC ........ *G06F 11/2273* (2013.01); *G06F 11/261* (2013.01)

(58) Field of Classification Search
CPC ............ G06F 11/3696; G06F 11/3688; G06F 11/261; G06F 11/3684; G06F 11/2273
See application file for complete search history.

(56) References Cited

U.S. PATENT DOCUMENTS

2016/0196200 A1* 7/2016 Mizobuchi .......... G06F 11/3684
717/124

* cited by examiner

*Primary Examiner* — An H Do
(74) *Attorney, Agent, or Firm* — Amin, Turocy & Watson, LLP

(57) ABSTRACT

System testing is described. An example system testing method includes: acquiring module relationship information for a system under test, the system under test including a plurality of modules, the module relationship information indicating a logical relationship between each two of the plurality of modules; and testing at least two modules in the system under test based on the module relationship information, the at least two modules being associated with each other for the same function implemented by the system under test. By use of the technical solution of the present disclosure, both system and module perspectives can be applied to system integration testing, so as to achieve a more comprehensive system testing coverage and find problems in the system under test as soon as possible, which can help to improve the system testing coverage and system testing efficiency.

20 Claims, 4 Drawing Sheets

SYSTEM TESTING METHOD, ELECTRONIC DEVICE, AND COMPUTER PROGRAM PRODUCT

RELATED APPLICATION

The present application claims the benefit of priority to Chinese Patent Application No. 202211294739.9, filed on Oct. 21, 2022, which application is hereby incorporated into the present application by reference herein in its entirety.

TECHNICAL FIELD

Embodiments of the present disclosure relate generally to overall system testing, and in particular, to a system testing method, an electronic device, and a computer program product, which can be used in the field of system testing.

BACKGROUND

At present, there are two conventional integration testing methods for a system under test, which are a single system integration testing method and an incremental integration testing method respectively. In the single system integration testing method, all modules of the system under test are simply assembled and tested. The system under test is tested as a large module. Therefore, the single system integration testing method does not pay attention to data flowing and operations among specific modules in the system under test. As a result, the larger the system under test is, the more potential test omissions will be caused by the single system integration testing method. In the incremental integration testing method, the modules of the system under test are integrated and tested according to a hierarchy. However, one of the most frustrating aspects in the incremental integration testing method is that functions of modules or subunits of the system under test are all correct, but a function implemented by the system as a whole cannot meet a requirement of a user, because the incremental integration testing method does not pay attention to a purpose of testing a high-level system layer of the system under test.

Therefore, the conventional integration testing methods have different shortcomings, and thus cannot meet a test purpose of testing the system under test accurately and efficiently.

SUMMARY

The embodiments of the present disclosure provide a system testing method, an electronic device, and a computer program product.

In a first example embodiment of the present disclosure, a system testing method is provided. The method includes: acquiring module relationship information for a system under test, the system under test including a plurality of modules, the module relationship information indicating a logical relationship between each two of the plurality of modules; and testing at least two modules in the system under test based on the module relationship information, the at least two modules being associated with each other for the same function implemented by the system under test.

In a second example embodiment of the present disclosure, an electronic device is provided. The electronic device includes: at least one processing unit; and at least one memory coupled to the at least one processing unit and storing instructions for execution by the at least one processing unit, where the instructions, when executed by the at least one processing unit, cause the device to perform actions including: acquiring module relationship information for a system under test, the system under test including a plurality of modules, the module relationship information indicating a logical relationship between each two of the plurality of modules; and testing at least two modules in the system under test based on the module relationship information, the at least two modules being associated with each other for the same function implemented by the system under test.

In a third example embodiment of the present disclosure, a computer program product is provided. The computer program product is tangibly stored on a non-transitory computer-readable medium and includes machine-executable instructions, where the machine-executable instructions, when executed, cause a machine to perform any step of the method described according to the first aspect of the present disclosure.

This Summary part is provided to introduce the selection of concepts in a simplified form, which will be further described in the Detailed Description below. This Summary part is neither intended to identify key features or essential features of the embodiments of the present disclosure, nor intended to limit the scope of the embodiments of the present disclosure.

BRIEF DESCRIPTION OF THE DRAWINGS

The above and other objectives, features, and advantages of the present disclosure will become more apparent by describing example embodiments of the present disclosure in more detail in combination with the accompanying drawings. In the example embodiments of the present disclosure, the same reference numerals generally represent the same parts.

In the drawings, identical or corresponding numerals represent identical or corresponding parts.

DETAILED DESCRIPTION

Figure 1:
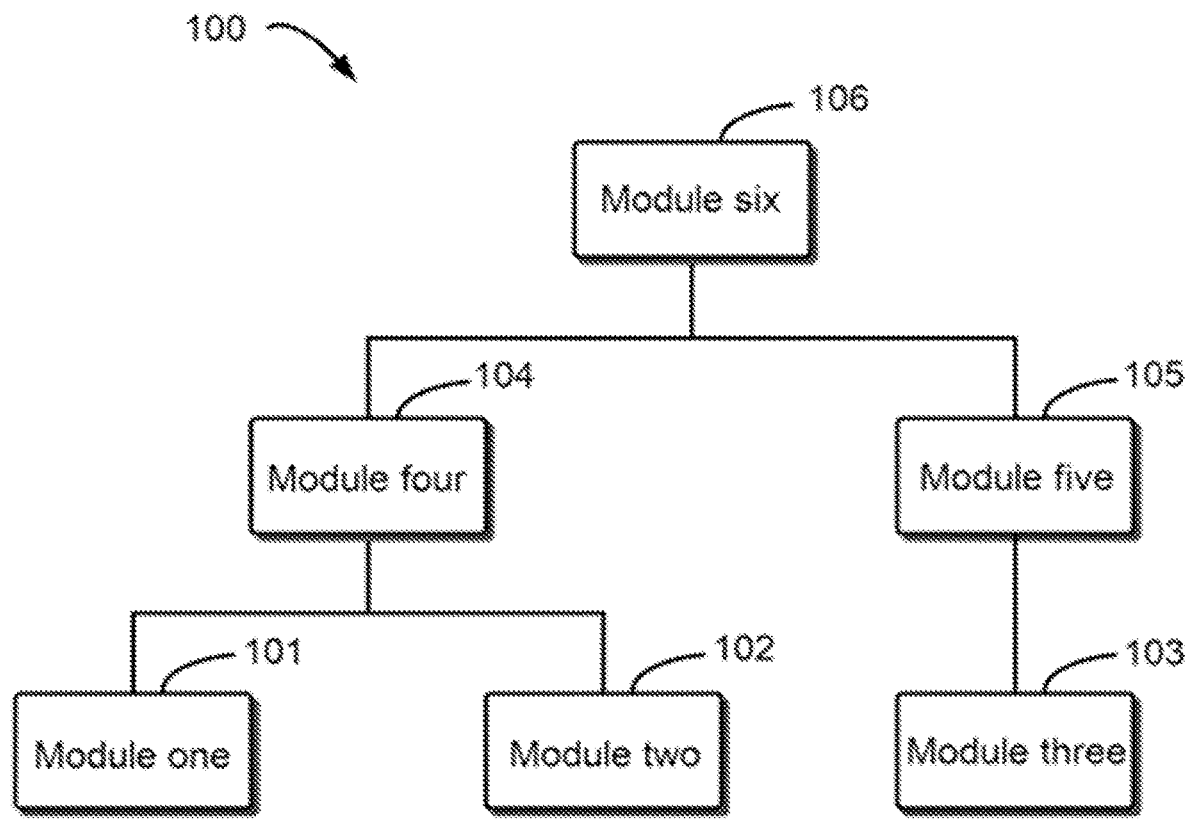
FIG. 1 illustrates tree diagram 100 representing logical relationships among modules of a system under test and generated for the system under test in conventional incremental testing.

Example embodiments of the present disclosure will be described in more detail below with reference to the accompanying drawings. Although example embodiments of the present disclosure are shown in the accompanying drawings, it should be understood that the present disclosure may be implemented in various forms and should not be limited by the embodiments set forth herein. Rather, these embodiments are provided to make the present disclosure more thorough and complete and to fully convey the scope of the present disclosure to those skilled in the art.

As used herein, the term "include" and variations thereof mean open-ended inclusion, for example, "including but not limited to." Unless specifically stated, the term "or" means "and/or." The term "based on" means "based at least in part on." The terms "an example embodiment" and "an embodiment" mean "at least one embodiment." The term "another embodiment" indicates "at least one additional embodiment." The terms "first," "second," and the like may refer to different or identical objects. Other explicit and implicit definitions may also be included below.

As described above in the Background, the conventional integration testing methods have different shortcomings, and thus cannot meet a test purpose of testing the system under test accurately and efficiently.

Specifically, the single system integration testing method is a method of integration testing in which all modules are grouped together and tested. For example, the single system integration testing method may be used when a complete software package is received by a test team formed on an ad hoc or project basis.

However, in the single system integration testing method, the whole software of the system under test is regarded as a black box for testing, so the single system integration testing method does not pay attention to data flowing and operations occurring between specific modules in the system under test. As can be seen, the single system integration testing method may be more suitable for testing small systems. On the contrary, the larger the system under test is, the more potential test omissions will be caused by the single system integration testing method. Therefore, the single system integration testing method is increasingly not suitable for system testing on current increasingly large systems.

The incremental integration testing method is completed by integrating two or more logically related modules and then testing normal operation of applications. Other related modules are then incrementally integrated, and the process continues until all the logically related modules have been successfully integrated and tested.

The incremental integration testing method can be performed according to a hierarchical relationship such as an inclusion relationship between the modules in a bottom-up or top-down manner. The bottom-up manner means starting to perform integration and testing from modules at the lowest level, while the top-down manner means starting to perform integration and testing from modules at the highest level.

FIG. 1 illustrates tree diagram 100 representing logical relationships among modules of a system under test and generated for the system under test in conventional incremental testing. As shown in FIG. 1, tree diagram 100 representing the logical relationships among the modules of the system under test includes, for example, 6 modules, which are module one 101, module two 102, module three 103, module four 104, module five 105, and module six 106 respectively.

As can be seen from tree diagram 100, module four 104 includes module one 101 and module two 102, module five 105 includes module three 103, and module six 106 includes module four 104 and module five 105. Therefore, tree diagram 100 shows three levels of modules, which are module six 106 at the highest level, module four 104 and module five 105 at an intermediate level, and module one 101, module two 102, and module three 103 at the lowest level.

When testing is performed in the bottom-up manner, testing may be performed first for module one 101, module two 102, and module three 103, then for module four 104 and module five 105, and finally for module six 106.

When testing is performed in the top-down manner, testing may be performed first for module six 106, then for module four 104 and module five 105, and finally for module one 101, module two 102, and module three 103.

However, since the incremental integration testing method does not pay attention to the purpose of testing the high-level system layer of the system under test but pays attention only to the testing between modules with a direct logical relationship, test results from the system perspective cannot be obtained. In contrast, since a requirement of a user for the function of the system under test is considered as a whole sometimes, the system under test is required only to realize this function. Therefore, the incremental integration testing method may result in that the function of each module is correct, but the system under test as a whole cannot meet the requirement of the user. In addition, a module relationship in an actual system under test may be very complex, and in many cases, it is not possible to fully express logical relationships among all modules only by using, for example, tree diagram 100 involved in the incremental integration testing method. For example, in tree diagram 100, module four 104 includes module one 101 and module two 102. However, if module five 105 also needs to include module two 102 in the system under test, it is impossible to fully reflect the logical relationship between module two 102 and module give 105 by adopting tree diagram 100.

In order to solve, at least in part, the above problems and one or more of other potential problems, the embodiments of the present disclosure propose a method for applying both system and module perspectives to system integration testing to improve system testing coverage and system testing efficiency.

Figure 2:
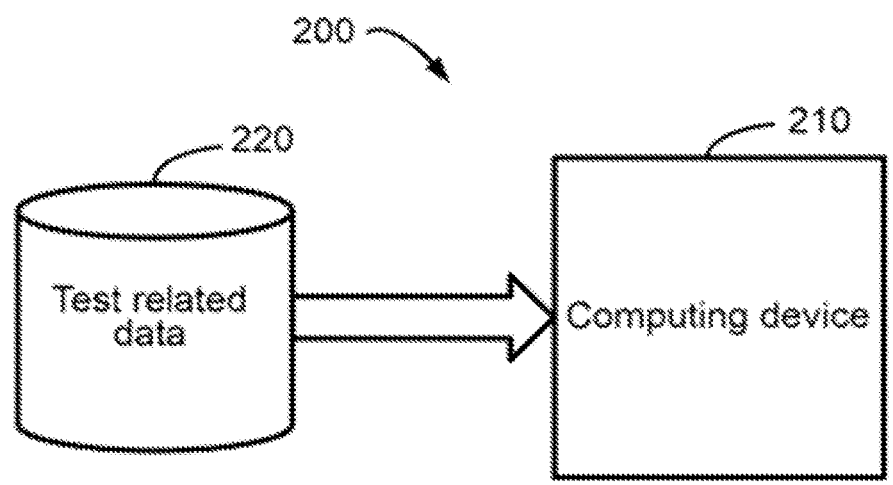
FIG. 2 illustrates a schematic diagram of system testing environment 100 in which a device and/or a method according to the embodiments of the present disclosure may be implemented.

FIG. 2 illustrates a schematic block diagram of system testing environment 200 in which a system testing method in some embodiments of the present disclosure may be implemented. According to an embodiment of the present disclosure, system testing environment 200 may be a cloud environment.

As shown in FIG. 2, system testing environment 200 includes computing device 210. In system testing environment 200, for example, test related data 220 including module relationship information for the system under test, an overall design document for the system under test, a module design document for the modules in the system under test, related code of the system under test, related code of the modules in the system under test, a function under test for the system under test, preset testing information for the system under test or user input that indicates the function under test, and specific modules in the system under test is provided to computing device 210 as input to computing device 210. According to an embodiment of the present disclosure, test related data 220 may also include other related data, parameters, and the like required for testing the modules in the system under test by computing device 210.

After receiving test related data 220, computing device 210 may test, based on received test related data 220, at least two modules in the system under test associated with each other for the same function that can be implemented by the system under test, may also generate a module relationship matrix based on module relationship information indicating a logical relationship between each two of the plurality of modules in the system under test, and may also generate a network diagram representing the logical relationships among the modules of the system under test based on the module relationship matrix. In addition, computing device 210 may determine, based on received test related data 220, another module in the system under test required for testing the at least two modules, and simulate the other module based on a function of the other module if the other module has not been acquired.

It should be understood that system testing environment 200 is only illustrative and not restrictive, and it is extensible or shrinkable. For example, system testing environment 200 may include more computing devices 210, and more test related data 220 can be provided to computing device 210 as input, so as to meet the demands of more users using more computing devices 210 simultaneously and even using more test related data 220 to perform system testing simultaneously or non-simultaneously.

In system testing environment 200 shown in FIG. 2, test related data 220 may be inputted to computing device 210 through a network.

According to the embodiments of the present disclosure, a system in a broad sense is a set of things. The set of things may be associated with one another in such a way that they generate their own behavior patterns over time. The system may be divided into three parts, that is, elements, interconnections, and functions or purposes. Based on different types of interconnections among different elements or modules, a module relationship matrix may be generated to reflect the system, and a logic chain among different modules may be derived from the module relationship matrix to verify a specific function or purpose.

Elements of the system are generally the most noticeable part, because many of the elements are visible and tangible. For example, elements that make up a system like a tree are roots, trunks, branches, and leaves. In another example, elements that make up a software system are modules that may differ, such as hardware modules and software modules.

The interconnections are relationships that bind elements together. For example, the interconnections in the system under test may be flows of data and flows of control that control the system to achieve its purpose. The system realizes the flows of control to achieve its purpose through signals. The signals also allow one part of the system to respond to a situation occurring in another part. Many interconnections are flows of information, such as signals that can reach decision points or action points within the system.

Figure 3:
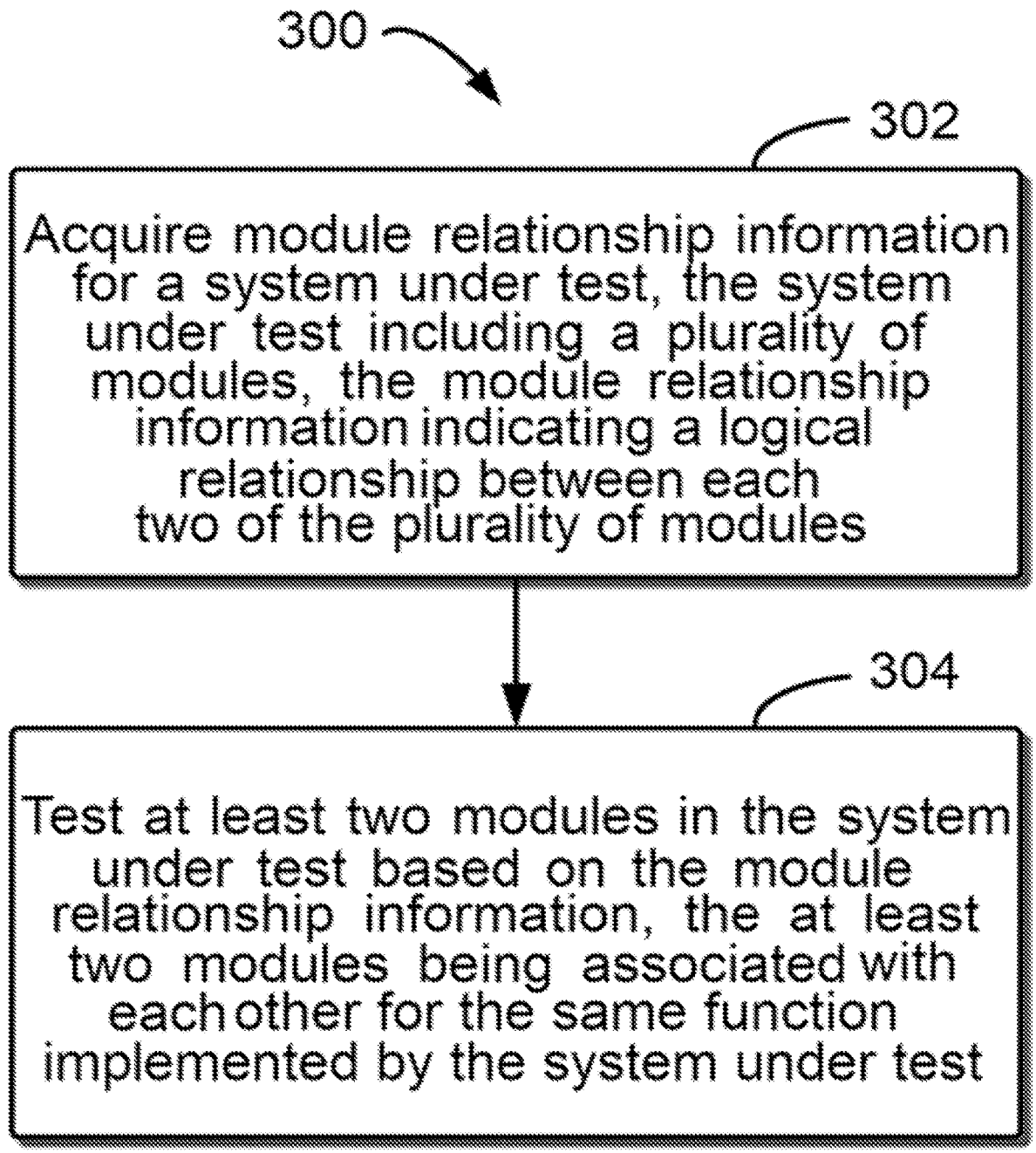
FIG. 3 illustrates a flow chart of system testing method 300 according to an embodiment of the present disclosure.

System testing method 200 shown in FIG. 3 is illustrated below by taking computing device 210 and test related data 220 included in FIG. 2 as an example.

FIG. 3 illustrates a flow chart of system testing method 300 according to an embodiment of the present disclosure. Method 300 may be implemented by computing device 210 shown in FIG. 2, or by other appropriate devices. It should be understood that system testing method 300 may also include additional steps that are not shown and/or may omit the shown steps, and the scope of the embodiments of the present disclosure is not limited in this aspect.

At block 302, computing device 210 acquires module relationship information for a system under test as test related data 220. According to this embodiment of the present disclosure, the system under test may include a plurality of modules, and the module relationship information may indicate a logical relationship between each two of the plurality of modules included in the system under test.

According to this embodiment of the present disclosure, since the modules in the system under test are mainly reflected as data input, data output, and implementation of specific functions, the modules in the system under test may be software modules or hardware modules, and in some cases may also be virtual modules.

In practice, the module relationship information of the system under test is sometimes not obvious, directly visible, or explicitly expressed. Therefore, according to this embodiment of the present disclosure, the module relationship information for the system under test may be acquired based on at least one of the following: an overall design document for the system under test, a module design document for the modules in the system under test, related code of the system under test, and related code of the modules in the system under test. Moreover, computing device 210 may first acquire the above content as test related data 220, and then infer the module relationship information for the system under test based on such content.

For example, the overall design document for the system under test may explicitly express the module relationship information for the system under test, and therefore the module relationship information for the system under test can also be inferred based on the related code of the system under test.

In another example, the module design document for the modules in the system under test may explicitly express input, output, and specific functions of the modules in the system under test, and therefore the module relationship information for the system under test can be inferred accordingly. Based at least on similar reasons, the module relationship information for the system under test can also be inferred based on the related code of the modules in the system under test.

In addition, according to this embodiment of the present disclosure, the logical relationship between each two of the plurality of modules included in the system under test may include at least one of the following: a causal relationship, an enhanced loop relationship, a balanced loop relationship, and no relationship.

When the causal relationship exists between two modules included in the system under test, such as module A and module B, it may be considered that module A will cause the occurrence of module B, or outflow of data of module A is equal to inflow of data of module B.

When the enhanced loop relationship exists between two modules included in the system under test, such as module A and module B, it may be considered that module A strengthens module B, module B also strengthens module A, and such operations are cycled. According to this embodiment of the present disclosure, a predefined dominant module between module A and module B, that is, from which module the data is originally sent, can be distinguished based on, for example, the overall design document for the system under test, the module design document for the modules in the system under test, the related code of the system under test, the related code of the modules in the system under test, and the like. If module A is identified as the dominant module, the enhanced loop relationship exists between module A and module B from the perspective of module A as the dominant module, but no relationship exists between module A and module B from the perspective of module B as a non-dominant module.

When the balanced loop relationship exists between two modules included in the system under test, such as module A and module B, it may be considered that module A strengthens module B, but module B weakens module A, and such operations are cycled. It is to be noted that the existence of the balanced loop relationship between two modules in the system under test may also be indicated by, for example, the overall design document for the system under test, the module design document for the modules in the system under test, the related code of the system under test, the related code of the modules in the system under test, and the like.

According to this embodiment of the present disclosure, the logical relationship existing between each two of the plurality of modules included in the system under test, for example, including a causal relationship, an enhanced loop relationship, a balanced loop relationship, and no relationship, is formed based on a system theory. However, according to this embodiment of the present disclosure, the logical relationship existing between each two of the plurality of modules included in the system under test may also be a logical relationship in any other forms. Therefore, the protection scope of the present disclosure is not limited to the foregoing logical relationship formed based on the system theory.

At block 304, computing device 210 tests at least two modules in the system under test based on the module relationship information acquired at block 302. According to this embodiment of the present disclosure, the at least two modules in the system under test are associated with each other for the same function that can be implemented by the system under test.

According to this embodiment of the present disclosure, computing device 210 may first acquire at least one of preset testing information for the system under test and user input that indicate a function under test for the system under test as test related data 220 and then determine the function under test for the system under test based on the preset testing information and the user input, and then can determine at least two modules associated with the function under test.

For example, computing device 210 may determine the at least two modules in the system under test directly based on the preset testing information or the user input. The testing information or the user input may directly indicate the foregoing at least two modules.

In another example, computing device 210 may determine the function under test needing to be tested based on the preset testing information or the user input, and may determine, based on module functions required for implementation of the function under test, at least two modules needing to be used to implement the function under test.

According to this embodiment of the present disclosure, computing device 210 may also test the at least two modules in the system under test not directly based on the module relationship information, but may first generate a module relationship matrix based on the module relationship information, and then test the at least two modules in the system under test based on the module relationship matrix. An example module relationship matrix may be shown in Table 1 below.

TABLE 1

|  | Module A | Module B | Module C | Module D | Module E |
| --- | --- | --- | --- | --- | --- |
| Module A | Not applicable | 1 | 0 | 3 | 0 |
| Module B | 0 | Not applicable | 2 | 1 | 0 |
| Module C | 1 | 0 | Not applicable | 0 | 1 |
| Module D | 0 | 0 | 1 | Not applicable | 0 |

TABLE 1-continued

|  | Module A | Module B | Module C | Module D | Module E |
| --- | --- | --- | --- | --- | --- |
| Module E | 0 | 1 | 0 | 0 | Not applicable |

As shown in the module relationship matrix shown in Table 1, elements in the module relationship matrix represent relationships among modules respectively corresponding to rows and columns in which the elements reside. For example, an element value 1 indicates that a logical relationship between a module corresponding to a row in which an element resides and a module corresponding to a column in which the element resides is a causal relationship, an element value 2 indicates that a logical relationship between a module corresponding to a row in which an element resides and a module corresponding to a column in which the element resides is an enhanced loop relationship, an element value 3 indicates that a logical relationship between a module corresponding to a row in which an element resides and a module corresponding to a column in which the element resides is a balanced loop relationship, and an element value 0 indicates that a logical relationship between a module corresponding to a row in which an element resides and a module corresponding to a column in which the element resides is no relationship. Therefore, for example, 1 in the second row and the third column of Table 1 indicates that the logical relationship between module A and module B is a causal relationship. In addition, an element showing "not applicable" means that no logical relationship exists between a module and itself.

According to this embodiment of the present disclosure, the module relationship matrix may directly reflect the module relationship information. Therefore, for example, when the user indicates that module A and module E need to be tested, although no direct logical relationship exists between module A and module E and a corresponding element in the second row and the sixth column in the module relationship matrix has a value of 0, it may be easy to determine, based on the module relationship matrix, that a logical relationship between module A and module E may be reflected through, for example, a logical chain formed by the following several modules:

module A→module B→module C→module E.
module A→module D→module C→module E.

In addition, since a logical relationship exists between module 5 and module 2, and a logical relationship also exists between module 2 and module 3 and between module 2 and module 4 respectively, the logical relationship between module A and module E may also be reflected through, for example, a more complex logical chain:

module A→module B→module C→module E→module B→module C→module E.
module A→module D→module C→module E→module B→module D→module C→module E.

According to this embodiment of the present disclosure, after the module relationship matrix is generated based on the module relationship information, a network diagram representing the logical relationships among the modules of the system under test may be further generated based on the module relationship matrix, so that the logical relationships among the modules of the system under test can be seen intuitively through the network diagram.

Figure 4A:
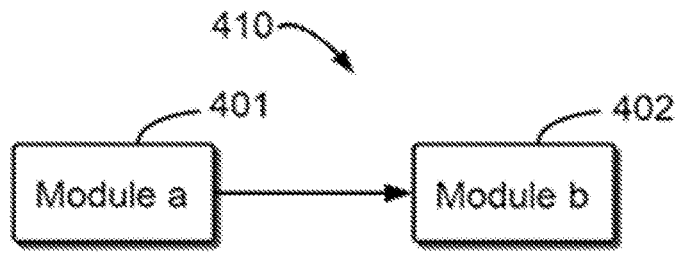
FIG. 4A, FIG. 4B, and FIG. 4C respectively illustrate logical relationships among modules in a system under test according to an embodiment of the present disclosure.
Figure 4B:
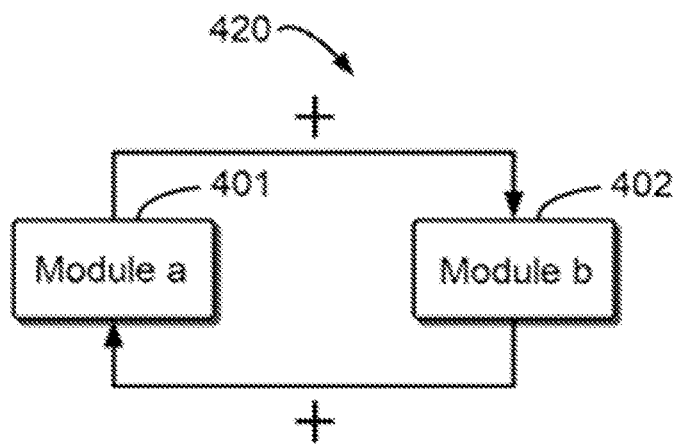
Figure 4C:
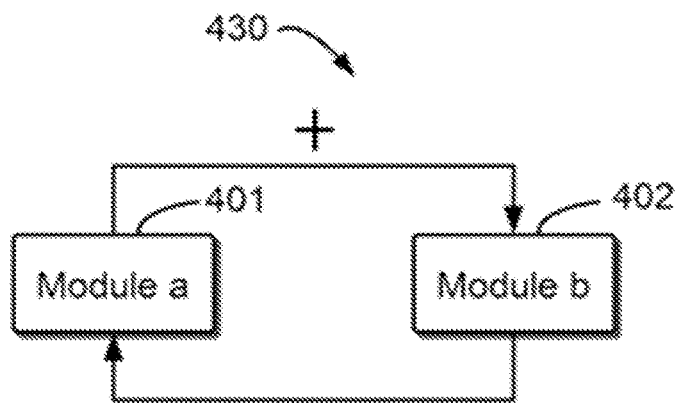

FIG. 4A, FIG. 4B, and FIG. 4C respectively illustrate logical relationships among modules in a system under test according to an embodiment of the present disclosure. As shown by logical relationship 410 in FIG. 4A, an arrow of module a 401 pointing to module b 402 indicates that the logical relationship between module a 401 and module b 402 is a causal relationship. As shown by logical relationship 420 in FIG. 4B, module a 401 has an arrow pointing to module b 402, module b 402 also has an arrow pointing to module a 401, and "+" signs are next to the two arrows respectively, which indicates that the logical relationship between module a 401 and module b 402 is an enhanced loop relationship. As shown by logical relationship 430 in FIG. 4C, module a 401 has an arrow pointing to module b 402, module b 402 also has an arrow pointing to module a 401, and at the same time, a "+" sign is next to the arrow of module a 401 pointing to module b 402, while a "−" sign is next to the arrow of module b 402 pointing to module a 401, which indicates that the logical relationship between module a 401 and module b 402 is a balanced loop relationship.

Based on the logical relationships among the modules in the system under test according to this embodiment of the present disclosure respectively illustrated above in FIG. 4A, FIG. 4B, and FIG. 4C, a network diagram representing the logical relationships among the modules of the system under test can be easily generated based on the module relationship matrix.

Figure 5:
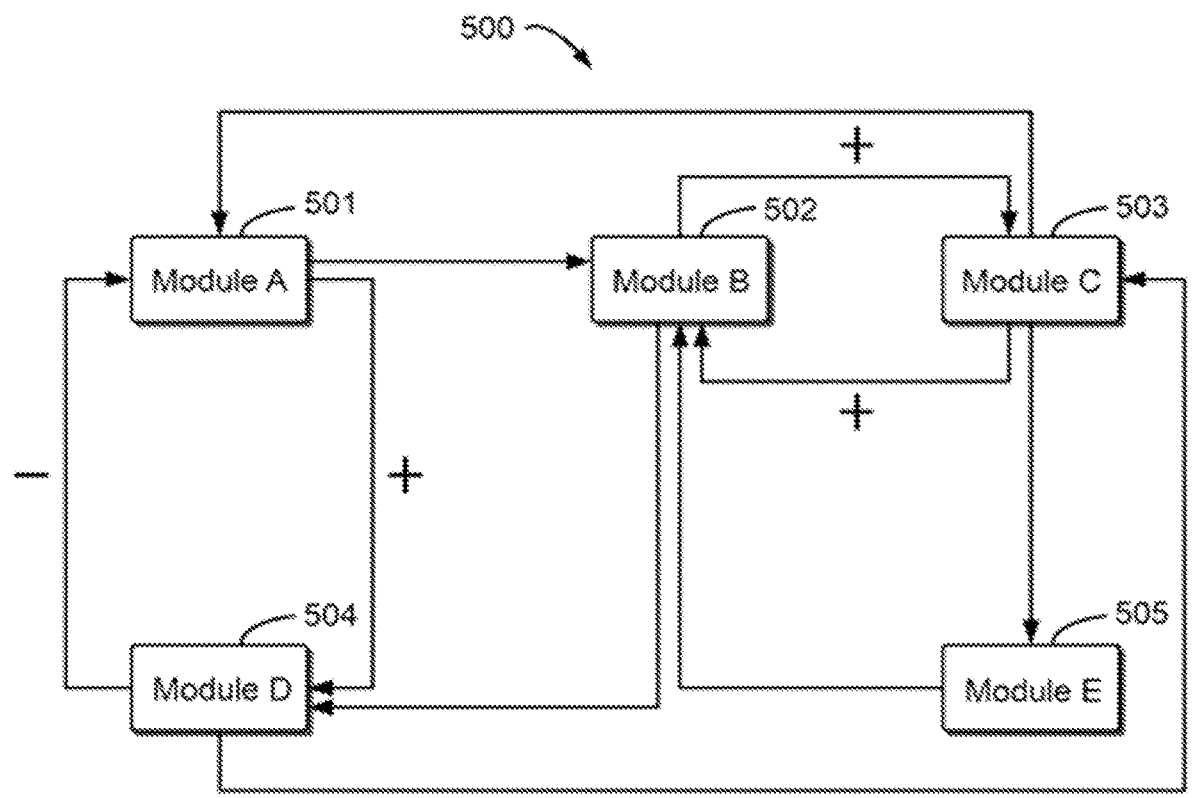
FIG. 5 illustrates network diagram 500 representing logical relationships among modules of a system under test and generated based on a module relationship matrix according to an embodiment of the present disclosure.

FIG. 5 illustrates network diagram 500 representing logical relationships among modules of a system under test and generated based on a module relationship matrix according to an embodiment of the present disclosure. As shown in network diagram 500, module A 501 is in a logical relationship with module B 502 and module D 504, module B 502 is in a logical relationship with module C 503 and module D 504, module C 503 is in a logical relationship with module A 501 and module E 505, module D 504 is in a logical relationship with module C 503, and module E 505 is in a logical relationship with module B 502. It is to be noted that, since network diagram 500 is generated based on, for example, the example module relationship matrix shown in Table 1, network diagram 500 fully reflects the logical relationships among the modules shown in the example module relationship matrix shown in Table 1.

According to this embodiment of the present disclosure, when the at least two modules in the system under test are tested, it is likely that some modules or some other modules in the system under test that will be used to test the at least two modules have not been acquired, and input, corresponding output, and functions that should be implemented required by such modules that have not been acquired are known only through, for example, the overall design document for the system under test, the module design document for the modules in the system under test, the related code of the system under test, and the related code of the modules in the system under test. In this case, computing device 210 may first determine the modules that have not been acquired, and then simulate the modules based on functions of the modules that have not been acquired, so that the testing for the at least two modules in the system under test can proceed normally.

Related content of system testing environment 200 in which a device and/or a method according to embodiments of the present disclosure may be implemented, system testing method 300 according to an embodiment of the present disclosure, logical relationships among modules in a system under test according to an embodiment of the present disclosure, and network diagram 500 representing logical relationships among modules of a system under test and generated based on a module relationship matrix according to an embodiment of the present disclosure is described above with reference to FIG. 2 to FIG. 5. It should be understood that the above description is to better demonstrate the content recorded in the embodiments of the present disclosure, and is not intended to limit the present disclosure in any way.

It should be understood that the numbers of various elements and the magnitudes of physical quantities used in the embodiments and the drawings of the present disclosure are only examples, and are not intended to limit the protection scope of the embodiments of the present disclosure. The above numbers and magnitudes may be arbitrarily set as needed without affecting the normal implementation of the embodiments of the present disclosure.

Through the description above with reference to FIG. 2 to FIG. 5, according to the technical solutions of the embodiments of the present disclosure, a system testing method is proposed. By use of the system testing method of the present disclosure according to the embodiments of the present disclosure, both system and module perspectives can be applied to system integration testing, so as to achieve a more comprehensive system testing coverage and find the problems in the system under test as soon as possible, which can help to improve the system testing coverage and system testing efficiency.

Figure 6:
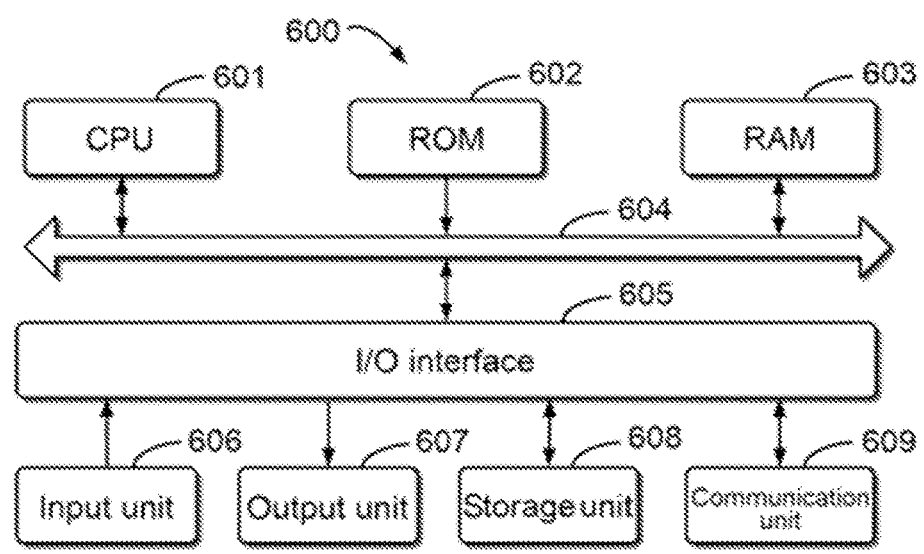
FIG. 6 illustrates a schematic block diagram of example device 600 that may be used to implement embodiments of the present disclosure.

FIG. 6 illustrates a schematic block diagram of example device 600 that may be used to implement embodiments of the present disclosure. According to an embodiment of the present disclosure, computing device 210 in FIG. 2 may be implemented by device 600. As shown in the figure, device 600 includes central processing unit (CPU) 601 that may execute various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

The various processes and processing described above, for example, method 300, may be performed by processing unit 601. For example, in some embodiments, method 300 may be implemented as a computer software program that is tangibly included in a machine-readable medium such as storage unit 608. In some embodiments, part of or all the computer program may be loaded and/or installed onto device 600 via ROM 602 and/or communication unit 609. When the computer program is loaded to RAM 603 and executed by CPU 601, one or more actions of method 300 described above may be executed.

The embodiments of the present disclosure may relate to a method, a device, a system, and/or a computer program product. The computer program product may include a computer-readable storage medium on which computer-readable program instructions for performing various aspects of the embodiments of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the foregoing. More specific examples of the computer-readable storage medium as a non-exhaustive list include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage media used herein are not to be interpreted as transient signals per se, such as radio waves or other freely propagating electromagnetic waves, electromagnetic waves propagating through waveguides or other transmission media, for example, light pulses through fiber optic cables, or electrical signal transmitted via electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the embodiments of the present disclosure may be assembly instructions, instruction set architecture (ISA) instructions, machine instructions, machine-related instructions, microcode, firmware instructions, state setting data, or source or object code written in any combination of one or more programming languages, where the programming languages include object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer over any kind of networks, including a LAN or a WAN, or may be connected to an external computer, for example, through the Internet by using an Internet service provider. In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the embodiments of the present disclosure.

Various aspects of the embodiments of the present disclosure are described here with reference to the flow charts and/or block diagrams of the method, the device/system, and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or technical improvements to technologies on the market, or to enable other persons of ordinary skill in the art to understand the embodiments disclosed here.

What is claimed is:

1. A method, comprising:
    acquiring, by a system comprising a processor, module relationship information for a system under test, the system under test comprising modules, the module relationship information indicating a logical relationship between each two of the modules;
    determining, by the system, a function under test for the system under test;
    determining, by the system, the at least two modules associated with the function under test;
    generating, by the system, a module relationship matrix representing the logical relationships among the modules, wherein rows and columns of the matrix correspond to the modules and each element in the matrix identifies a system-theory logical relationship between a corresponding pair of modules; and
    testing the at least two modules in the system under test based on the module relationship information, the at least two modules being associated with each other for a same function implemented by the system under test.

2. The method according to claim 1, wherein the module relationship information for the system under test is acquired based on at least one of:
    an overall design document for the system under test;
    a module design document for the modules in the system under test;
    related code of the system under test; or
    related code of the modules in the system under test.

3. The method according to claim 1, wherein the logical relationship comprises at least one of:
    a causal relationship;
    an enhanced loop relationship;
    a balanced loop relationship; or
    no relationship.

4. The method according to claim 1, wherein the function under test for the system under test is determined based on at least one of:
    preset testing information for the system under test, the preset testing information indicating the function under test; or
    user input indicating the function under test.

5. The method according to claim 1, wherein testing based on the module relationship matrix comprises identifying, from the module relationship matrix, a logical chain of modules associated with the function under test and testing the logical chain of modules.

6. The method according to claim 1, further comprising:
    generating a network diagram representing the logical relationships among the modules of the system under test based on the module relationship matrix.

7. The method according to claim 1, further comprising:
    determining another module in the system under test and required for testing the at least two modules; and
    simulating the other module based on a function of the other module based on the other module not having been acquired.

8. A device, comprising:
    at least one processing unit; and
    at least one memory coupled to the at least one processing unit and storing instructions for execution by the at least one processing unit, wherein the instructions, when executed by the at least one processing unit, cause the device to perform actions comprising:
        acquiring module relationship information for a system under test, the system under test comprising a group of modules, the module relationship information indicating a logical relationship between each of the group of modules;
        determining a function under test for the system under test;
        determining at least two modules associated with the function under test;
        generating a module relationship matrix representing the logical relationships among the group of modules, wherein rows and columns of the matrix correspond to the modules and each element in the matrix identifies a system-theory logical relationship between a corresponding pair of modules; and
        testing the at least two modules in the system under test based on the module relationship information, the at least two modules being associated with each other for a same function implemented by the system under test.

9. The device according to claim 8, wherein the module relationship information for the system under test is acquired based on at least one of the following:
    an overall design document for the system under test;
    a module design document for the modules in the system under test;
    related code of the system under test; and
    related code of the modules in the system under test.

10. The device according to claim 8, wherein the logical relationship comprises at least one of the following:
    a causal relationship;
    an enhanced loop relationship;
    a balanced loop relationship; and
    no relationship.

11. The device according to claim 8, wherein the function under test for the system under test is determined based on at least one of the following:
    preset testing information for the system under test, the preset testing information indicating the function under test; and
    user input, the user input indicating the function under test.

12. The device according to claim 8, wherein testing based on the module relationship matrix comprises identifying, from the module relationship matrix, a logical chain of modules associated with the function under test and testing the logical chain of modules.

13. The device according to claim 8, wherein the actions further comprise:
    generating a network diagram representing the logical relationships among the group of modules of the system under test based on the module relationship matrix.

14. The device according to claim 8, wherein the actions further comprise:
    determining another module in the system under test and required for testing the at least two modules; and
    simulating the other module based on a function of the other module in response to the other module not having been acquired.

15. A computer program product that is stored in a non-transitory computer-readable medium and comprises machine-executable instructions, wherein the machine-executable instructions, when executed via a processor, facilitate performance of operations, comprising:

acquiring, by a system comprising at least one processor, module relationship information for a system under test, the system under test comprising modules, the module relationship information indicating a logical relationship between each pair of the modules;

determining, by the system, a function under test for the system under test and at least two modules associated with the function under test;

generating, by the system, a module relationship matrix representing the logical relationships among the modules, wherein rows and columns of the matrix correspond to the modules and each element in the matrix identifies a system-theory logical relationship between a corresponding pair of modules; and testing the at least two modules in the system under test based on the module relationship information, the at least two modules being associated with each other for a same function implemented by the system under test.

16. The computer program product according to claim 15, wherein the module relationship information for the system under test is acquired based on at least one of:
an overall design document for the system under test,
a module design document for the modules in the system under test,
related code of the system under test, or
related code of the modules in the system under test.

17. The computer program product according to claim 15, wherein the logical relationship comprises at least one of:
a causal relationship,
an enhanced loop relationship,
a balanced loop relationship, or
no relationship.

18. The computer program product according to claim 15, wherein the function under test for the system under test is determined based on at least one of the following:
preset testing information for the system under test, the preset testing information indicating the function under test; and
user input indicating the function under test.

19. The computer program product according to claim 15, wherein the operations further comprise generating a network diagram representing the logical relationships among the modules of the system under test based on the module relationship matrix.

20. The computer program product according to claim 15, wherein the operations further comprise:
determining another module in the system under test and required for testing the at least two modules; and
simulating the other module based on a function of the other module in response to the other module not having been acquired.

* * * * *